US009774726B1

(12) United States Patent
Jenkins et al.

(10) Patent No.: US 9,774,726 B1
(45) Date of Patent: Sep. 26, 2017

(54) DETECTING AND PREVENTING FRAUD AND ABUSE IN REAL TIME

(71) Applicant: Microsoft Technology Licensing, LLC, Redmond, WA (US)

(72) Inventors: Joshua Jenkins, Woodinville, WA (US); Srividya Mohan, Redmond, WA (US); Dave Lickorish, Sammamish, WA (US); Balinder Malhi, Seattle, WA (US); David Racz, Palo Alto, CA (US); Jacek Korycki, San Jose, CA (US); Manuel Ocampo, Redmond, WA (US)

(73) Assignee: Microsoft Technology Licensing, LLC

( * ) Notice: Subject to any disclaimer, the term of this patent is extended or adjusted under 35 U.S.C. 154(b) by 0 days.

(21) Appl. No.: 15/389,379

(22) Filed: Dec. 22, 2016

(51) Int. Cl.
*H04M 15/00* (2006.01)
*H04M 3/22* (2006.01)
*H04M 7/00* (2006.01)
*H04L 29/06* (2006.01)
*H04W 12/12* (2009.01)

(52) U.S. Cl.
CPC ...... *H04M 3/2281* (2013.01); *H04L 65/1076* (2013.01); *H04M 3/2218* (2013.01); *H04M 7/0078* (2013.01); *H04M 2203/6027* (2013.01); *H04W 12/12* (2013.01)

(58) Field of Classification Search
CPC ...... H04M 15/00; H04M 15/41; H04M 15/47; H04M 15/58; H04M 2215/048; H04M 2215/32; H04M 2203/6027; H04W 12/06; G06Q 10/00
USPC .......... 379/114.04, 114.14, 145, 121.04, 126
See application file for complete search history.

(56) References Cited

U.S. PATENT DOCUMENTS

| | | | | |
|---|---|---|---|---|
| 6,163,604 A | * | 12/2000 | Baulier | H04M 3/36 379/145 |
| 6,219,538 B1 | * | 4/2001 | Kaminsky | H04M 15/00 455/410 |
| 7,251,624 B1 | * | 7/2007 | Lee | G06Q 30/06 705/26.1 |
| 8,031,849 B1 | | 10/2011 | Apple et al. | |
| 8,411,833 B2 | | 4/2013 | Dolan et al. | |
| 9,203,962 B2 | | 12/2015 | Guerra et al. | |

(Continued)

OTHER PUBLICATIONS

Zadah, Yossi, "Identifying Toll Fraud is Harder Than finding a Needle in a Haystack", http://blog.audiocodes.com/identifying-toll-fraud-is-harder-than-finding-a-needle-in-a-haystack/, Published on: Jun. 2, 2014, 4 pages.

(Continued)

*Primary Examiner* — Binh Tieu
(74) *Attorney, Agent, or Firm* — Talem IP Law, LLP

(57) ABSTRACT

A system and method for detecting and preventing PSTN fraud and abuse in real time includes a detection engine and a call management engine. The system includes at least one user record, at least one call data record, at least one fraud score record, and at least one remediation record. A call management engine enables users to establish VoIP calls connections to destination phone numbers. A fraud detection engine screens VoIP call connections to detect potential fraud and generates fraud records and remediation records when potential fraud is detected. The fraud detection engine may additionally direct the call management to terminate a VoIP call connection.

20 Claims, 5 Drawing Sheets

(56) References Cited

U.S. PATENT DOCUMENTS

| | | | |
|---|---|---|---|
| 9,270,833 B2 | 2/2016 | Ballai et al. | |
| 9,419,988 B2 | 8/2016 | Alexander | |
| 9,426,302 B2 | 8/2016 | Layman et al. | |
| 2005/0278550 A1* | 12/2005 | Mahone | H04M 15/00 |
| | | | 713/189 |
| 2007/0124246 A1* | 5/2007 | Lawyer | G06Q 10/00 |
| | | | 705/50 |
| 2012/0263285 A1* | 10/2012 | Rajakumar | G10L 17/00 |
| | | | 379/189 |
| 2012/0287810 A1 | 11/2012 | Shim et al. | |
| 2013/0336169 A1 | 12/2013 | Tai et al. | |

OTHER PUBLICATIONS

Beggs, Ronnie, "Streaming analytics from CDRs: Real-time Big Data Analytics in Motion", http://sqlstream.com/2013/12/streaming-analytics-from-cdrs-real-time-big-data-analytics-in-motion/, Published on: Dec. 6, 2013, 4 pages.

"Call Analytics and Telecom fraud detection", http://web.archive.org/web/20151219142947/http:/www.humbuglabs.org/, Published on: Dec. 19, 2015, 2 pages.

"Fraud Detection Services", http://web.archive.org/web/20160417212447/http:/voipinnovations.com/FraudDetection, Published on: Apr. 17, 2016, 2 pages.

* cited by examiner

| Tenant Aggregate Record 601 |
| --- |
| PK    AggregateRecordId |
| AggregateDate |
| AggregatePeriod |
| TenantId |
| CallCount |
| TotalCallDuration |
| AverageCallDuration |
| CallDurationStdDev |
| TotalCost |
| CostStdDev |

Fig. 5

DETECTING AND PREVENTING FRAUD AND ABUSE IN REAL TIME

BACKGROUND OF THE INVENTION

Communication services, such as Skype®, that use Voice over Internet Protocol (VoIP) technology are capable of making calls from Internet-connected devices, such as computers and smartphones, to phone numbers within the public switched telephone network (PSTN). Such capabilities, however, also provide an opportunity for unscrupulous users to engage in fraud. Because users can sign up for calling services with minimal documentation, they can use the ready availability of calling services to engage in fraudulent schemes that incur significant costs to the users and operators of call services.

A VoIP service provider, such as Skype® for Business voice, can be exposed to fraudulent and abusive uses of its calling functionality, which can significantly reduce profitability. The fees paid by VoIP users must be sufficient to offset the fees paid by the VoIP provider and leave the VoIP provider with a profit. Whenever a customer makes a call to a PSTN phone number using a VoIP service, the customer incurs two types of costs: a so-called "termination cost," which is a one-time fee for connecting the call; and an ongoing per-minute cost while the call is active. The termination cost to a foreign destination number may be far greater than the termination cost for a domestic destination number. For flat-rate, minute-capped plans, a service provider typically bears these costs and charges a sufficiently high service fee to make a profit after the costs are deducted. For pay-per-minute plans, a so-called "tenant" (i.e., an organization having a unified billing account for multiple users) typically bears these costs and pays an additional fee to the service provider. Fraudulent and abusive uses of VoIP services are costly for their providers and legitimate users, as the costs incurred by a VoIP connection are usually non-refundable, even if the connection is later discovered to have been made for an improper purpose. It will be further appreciated that when toll free numbers are provided, fraudulent or abusive use can also apply to incoming calls. The systems described herein are equally applicable to screen incoming VoIP calls.

Where VoIP services are offered to a user on a fixed-fee plan, the VoIP provider makes a profit only if the fixed fee received from the user exceeds the total costs of operating that user's VoIP connections during the corresponding fixed-fee period. Fraud on a fixed-fee plan is highly damaging, as the fraudulent VoIP connections incur fees that quickly consume the VoIP provider's profit margin. Alternatively, a VoIP service may be offered to a user on a per-minute basis. In a per-minute plan, to user pays a fee to the VoIP provider for each minute that a VoIP connection is open. The per-minute fee paid by the user to VoIP provider is higher than the per-minute fee paid by the VoIP provider, to allow the VoIP provider to realize a profit. Fraud on a per-minute plan creates unauthorized per-minute fees that are charged to the user, which tends to damage the VoIP provider's customer relationship with the user. The user typically demands the unauthorized fees be refunded, which the VoIP provider often must do to ensure customer satisfaction. As a result, the VoIP provider is left to bear the burden of both the fees payable against the third parties as well as the fees improperly incurred against the user.

One way by which fraud may be carried out is through a so-called "minute-pumping" scheme. In a minute-pumping scheme, a bad actor first establishes a revenue-sharing phone number, such as a United States phone number in the 900 area code. When a revenue-sharing phone number is dialed, a fraction of the fees incurred during the call are shared with the party that registered the number (e.g., the bad actor in a minute pumping scheme). The stolen credit-card information or other improper means may be used by a bad actor to sign up for one or more accounts on a calling service, such as Skype®. For example, the stolen credit card information is used to sign up for one or more tenancies in the Office 365® service and to obtain one of the Business Voice licenses assigned to one or more users (per tenancy). The revenue sharing phone number is then registered with a particular PSTN provider. For the termination cost and per-minute cost, the bad actor will receive a portion of the profits. Each of those accounts is used to repeatedly make calls to the revenue-sharing number, thereby accruing calling fees. Each fraudulent call serves no purpose aside from maintaining an open call connection to incur fees; the content of the call may well be silence. The VoIP provider is left to deal with the costs incurred by the connection as well as any fees that would ordinarily be collected from a legitimate user. For example, when the bad actor uses the multiple user accounts/tenancies to make as many calls as they can to that number, the VoIP service provider ultimately has to pay both the costs to the revenue sharing PSTN provider, as well as the chargeback to the credit card company to cover the fraudulent charges used to purchase the account services. For a single tenancy of twenty (20) seats/user, improper calls can easily cost the PSTN service provider anywhere from ~$20,000 to over $1 million (depending on whether they are using domestic or international destinations).

Alternatively, an individual may engage in abusive use of an otherwise authorized VoIP user account. Abusive use differs from minute-pumping in that the call connection involved enables actual communication even though the charges incurred are not authorized. An employee of a large company, for example, may be authorized to make international calls through the company's calling-service account as part of his or her work responsibilities. The large company has a tenancy that includes a "wallet" (i.e., balance of money) for international calls. The employee, however, may improperly use those calling privileges to make phone calls every day to friends and relatives in a distant country (e.g., a high termination cost international location), and in this manner the employee abuses the account, thereby incurring significant calling charges to the company's account. This scenario could be in combination with the previous scenario if the user's account has been taken over by a bad actor or other unauthorized entity. The tenant then quickly runs out of wallet money, and either has all of their international calls denied or the wallet is auto-refreshed with funds from a payment instrument. The company and the VoIP provider are then left to foot the bill for the calls, with the Tenant Admin/Company angry that the PSTN service provider did not inform them that a single user was consuming a significant amount of their balance.

VoIP fraud may be especially disruptive for organizations on per-minute VoIP plans. VoIP services, such as Skype® for Business, may offer organizational billing accounts (e.g., "wallets"), which are pre-funded by the organization. When fraudulent or unauthorized VoIP connections are made through the organization's VoIP accounts, those connections may completely deplete the funds in the account, at which point VoIP calling would be disabled on an organization-wide basis. The organization is likely to lose significant time, money and potential business before normal VoIP calling is restored. Alternatively, if the "wallet" feature may have an "auto-refill" automatic payment feature, fraudulent VoIP connections may incur costs indefinitely, until the tenant or VoIP service provider notices the fraud.

Different types of systems and methods have been proposed for detecting and preventing PSTN fraud and abuse. However, such systems and methods have their limitations and can always be improved.

Accordingly, there is a need for a system and method for detecting and preventing PSTN fraud and abuse in real time. There is a further need for a system and method for detecting and preventing PSTN fraud and abuse that does not rely solely on fixed rules to determine whether a VoIP connection is likely to be fraudulent. There is an additional need for a system and method for detecting and preventing PSTN fraud and abuse that screens VoIP call connections to detect potential fraud. There is yet a further need for a system and method for detecting and preventing PSTN fraud and abuse that employs machine-learning to continually adapt to the changing patterns of users while detecting and preventing PSTN fraud and abuse. There is a still further need for a system and method for detecting and preventing PSTN fraud and abuse that terminates existing call connections in close temporal proximity to PSTN fraud and abuse being detected.

BRIEF SUMMARY OF THE INVENTION

A system and method for detecting and preventing PSTN fraud and abuse illustrated herein prevents PSTN fraud and abuse in real time. The system and method for detecting and preventing PSTN fraud and abuse illustrated herein does not rely solely on fixed rules to determine whether a VoIP connection is likely to be fraudulent. The system and method for detecting and preventing PSTN fraud and abuse illustrated herein screens VoIP call connections to detect potential fraud. The system and method for detecting and preventing PSTN fraud and abuse illustrated herein employs machine-learning to detect and prevent PSTN fraud and abuse. The system and method for detecting and preventing PSTN fraud and abuse illustrated herein terminates call connections when PSTN fraud and abuse are detected.

An embodiment of the present invention is illustrated by a pipeline for detecting and blocking PSTN Fraud/Abuse in real-time (e.g., in close temporal proximity to the initiation of fraudulent/abusive activity while the activity is still ongoing), which conforms to legal and compliance requirements for a cloud-based service (e.g., Office 365 service). The inventive system generates a usage record for each VoIP connection. Each usage record includes information on various properties of the connection (each a "dimension"), such as the call duration, destination number, and originating user. Usage records may be aggregated on the basis of one or more dimensions. Aggregation of usage records facilitates detection of fraud and suspicious usage by pre-defined rules and machine-learning models. Upon detection of suspicious/fraudulent behavior, automated decisions can be made (e.g., termination of a call) or the suspicious activity can be passed along to human fraud screeners for further review. Embodiments of the present invention overcome limitations of prior-art systems by carrying out the detection and prevention of fraud in real-time. By applying fraud-detection processes to ongoing VoIP connections and incorporating machine-learning techniques into those processes, fraud and abuse will be significantly reduced.

Embodiments of the present invention run rules in real-time, triggering off events such as call start, call end, and call ticks (e.g., a call tick occurs periodically, e.g., every minute, throughout the duration of the call). This enables blocking in close temporal proximity (e.g., within 1-2 minutes) of the onset of fraudulent behavior.

In addition to providing hard-coded rules for detection of blatant fraud and suspicious behavior, machine-learning models are leveraged to detect and score the likelihood of fraud/abuse, including anomaly detection of previously-undetected patterns.

A data warehouse is dynamically built (i.e., as VoIP connections are created) with usage records, aggregating these usage records on the basis of dimensions relevant to the detection of fraud and abuse (e.g., the user or tenant making the call, the destination PSTN phone number, the region or country in which that phone number is located). This, in turn, enables the PSTN service provider to run thousands of highly-efficient queries per minute to run machine-learning models and hard-coded rules in real-time.

The entire infrastructure can be built using cloud-based technologies (e.g., the Azure cloud platform) for scaling, which enables cost savings as there can be a scaling down during off-peak hours and a scaling up during peak hours.

While data for fraud and abuse detection may be primarily pulled from usage records, other data sources may also provide relevant information on users and tenants, including non-PSTN information (e.g., the number of Microsoft Exchange licenses held by a tenant), which provides additional metrics to determine whether a given pattern of VoIP usage is abnormal and likely fraudulent.

Fraud can additionally be detected at the signup stage for VoIP accounts through the use of data from other services to find repeat fraudsters across multiple services (e.g., Office 365, Xbox.com, etc.).

Likewise, embodiments of the present invention provides allow a VoIP service provider to respect all legal/geographical requirements and other (e.g., Office 365) requirements for privacy and data protection.

Embodiments of the present invention include a system and method for the real-time detection and prevention of fraud and abuse in VoIP connections to PSTN phone numbers.

An embodiment of the present invention includes at least one user record. Each user record corresponds to a user and may include the user's identifying information. By way of illustration but not limitation, such identifying information may include: a username for the user; the user's complete legal name; the user's billing address; the user's e-mail address; and a unique identification code for the user.

An embodiment of the present invention includes at least one call record. Each call record corresponds to a VoIP connection. Each call record contains information relevant to determining whether the corresponding VoIP connection is suspicious. By way of illustration but not limitation, each call record may include: the identity of the user who made the call; the phone number to which the call is made; the time at which the call started; the time at which the call ended; and whether the call is deemed suspicious.

An embodiment of the present invention includes a fraud detection engine. The fraud detection engine analyzes a VoIP connection to determines whether the call is suspicious. Upon the detection of a suspicious call, the fraud detection engine may trigger further actions with respect to the call, such as automatic termination of the call or review of the call by a human fraud screener. The fraud detection engine may be a set of computer instructions residing in computer memory and executed by a processor. In analyzing a call, the detection engine may analyze various properties of the call to determine whether the call is suspicious. By way of illustration but not limitation, the analyzed properties may include: the identity of the user making the call; the number to which the call is made; the fees applicable to the call; and whether previous calls made by the user were deemed suspicious. The detection engine may apply predetermined rules, machine-learning techniques, or a combination thereof to determine whether a call is suspicious. By way of illustration but not limitation, a predetermined rule may specify, for a specific user: that calls to a particular country, region code, or area code are automatically deemed suspicious; that calls made during a particular period of day are automatically deemed suspicious; or that calls whose duration exceeds a particular length are automatically deemed suspicious. A machine-learning technique may include an anomaly-detection process, a supervised-learning process, or a combination thereof. By way of illustration but not limitation, an anomaly-detection process may, for a VoIP connection: compare the country code, region code, or area code of the dialed phone number to phone numbers previously dialed by the user; and deem the call suspicious if the country code, region code, or area code has not previously been dialed by the user. By way of illustration but not limitation, a supervised-learning process may accept as inputs usage records for calls flagged as suspicious by human fraud screeners. The detection then uses those usage records as examples of suspicious calls.

The fraud detection engine can analyze a VoIP connection multiple times over the duration of the call. Each analysis may be triggered by a predefined event, such as the beginning of each minute in the call's duration. By periodically reanalyzing an ongoing call, a call can be deemed suspicious while it is still in progress. By way of illustration but not limitation, a call that incurs a high per-minute charge may not be deemed suspicious when only five minutes have elapsed in the call, but the call may be deemed suspicious after an hour has elapsed.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Other features and advantages will become apparent from the following more detailed description, taken in conjunction with the accompanying drawings, which illustrate, by way of example, the principles of the invention.

BRIEF DESCRIPTION OF DRAWINGS

The various present embodiments now will be discussed in detail with an emphasis on highlighting the advantageous features with reference to the drawings of various embodiments. The illustrated embodiments are intended to illustrate, but not to limit the invention. These drawings include the following figures, in which like numerals indicate like parts:

FIG. 5 shows a possible structure for an aggregate data record.

DETAILED DESCRIPTION OF THE INVENTION

Figure 1:
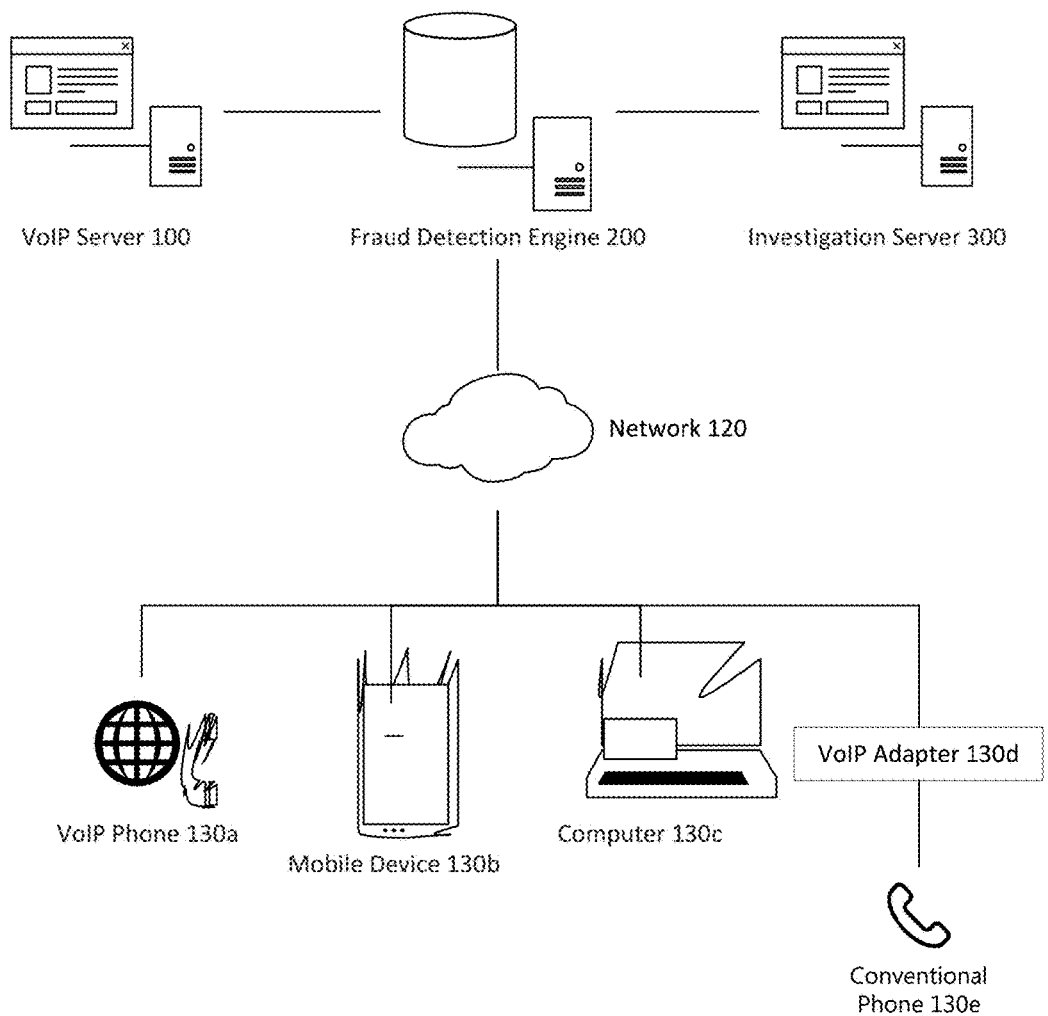
FIG. 1 is a diagram showing components of an embodiment of the invention.

The following detailed description describes present embodiments with reference to the drawings. In the drawings, reference numbers label elements of present embodiments. These reference numbers are reproduced below in connection with the discussion of the corresponding drawing features.

As a preliminary note, any of the embodiments described with reference to the figures may be implemented using software, firmware, hardware (e.g., fixed logic circuitry), or a combination of these implementations. The terms "logic," "module," "component," "system" and "functionality," as used herein, generally represent software, firmware, hardware, or a combination of these elements. For instance, in the case of a software implementation, the terms "logic," "module," "component," "system," and "functionality" represent program code/instructions that performs specified tasks when executed on a processing device or devices (e.g., CPU, CPUs or processor(s)). The program code can be stored at locations in one or more computer readable memory devices such as random access memory, disc drives or their equivalents.

More generally, the illustrated separation of logic, modules, components, systems, and functionality into distinct units may reflect an actual physical grouping and allocation of software, firmware, and/or hardware, or can correspond to a conceptual allocation of different tasks performed by a single software program, firmware program, and/or hardware unit. The illustrated logic, modules, components, systems, and functionality may be located at a single site (e.g., as implemented by a single processing device), or may be distributed over a plurality of locations and interconnected by a network.

The term "machine-readable media" and the like refers to any kind of non-transitory medium for retaining information in any form, including various kinds of storage devices (magnetic, optical, static, etc.). Machine-readable media also encompasses transitory forms for representing information, including various hardwired and/or wireless links for transmitting the information from one point to another.

The embodiments disclosed herein, may be implemented as a computer process (method), a computing system, or as an article of manufacture, such as a computer program product or non-transitory computer-readable media. The computer program product may be computer storage media, readable by a computer device, and encoding a computer program of instructions for executing a computer process. The computer program product may also be a propagated signal on a carrier, readable by a computing system, and encoding a computer program of instructions for executing a computer process.

The systems and processes described below are applicable and useful in the upcoming cloud computing environment. Cloud computing pertains to computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. The term "cloud" is intended to refer to the Internet and cloud computing allows shared resources, for example, software and information, to be available, on-demand, like a public utility.

Typical cloud computing providers deliver common business applications online, which are accessed from another web service or software like a web browser, while the software and data are stored remotely on servers. The cloud computing architecture uses a layered approach for providing application services. A first layer is an application layer that is executed on client computers. In this example, the application allows a client to access cloud storage. After the application layer is a cloud platform and cloud infrastructure, followed by a "server" layer that includes hardware and computer software designed for cloud-specific services.

A system and method for detecting and preventing PSTN fraud and abuse in real time includes a fraud detection engine and a call management engine. The call management engine enables users to establish VoIP calls connections to destination phone numbers. The fraud detection engine screens VoIP call connections to detect potential fraud and generates fraud records and remediation records when potential fraud is detected. The fraud detection engine may additionally direct the call management to terminate a VoIP call connection.

As described below, a highly optimized (for querying) database has been developed to contains all of the usage records. This includes aggregate data records, cached tenant/user information, and specific records generated and used by the system such as block lists, watch lists and safe lists.

A method of getting the block lists for the various Prefixes/Tenants/Users/Phone Numbers respected by a PSTN Routing infrastructure is utilized. One way to accomplish this is by providing an application programming interface (API) through which one can query and cache the block list, while another way is to provide a highly-available API to query in real-time. Yet another approach is be to provide direct database access to the PSTN Routing infrastructure.

A usage record listener has been developed that can receive/poll for new call data records (CDRs) or in-progress usage records (e.g., as a result of "ticks" of an ongoing call). Alternatively, the infrastructure that mediates the calls can insert data directly into the database.

A set of machine-learning features can be determined that serve as indicators of suspicious/fraudulent/abusive behavior. These can include absolute values (e.g., tenant type, tenant age, number of licensed users, tenant payment method) and temporal values (e.g., total duration of outbound calls over a time period, such as during the most recent twenty-four hours/seven days/etc., average call duration over that period, the standard deviation of call duration over that period). Various machine-learning models are built based on the features defined and updated as verified examples of fraudulent or abusive VoIP connections are identified and used to train the machine-learning systems.

A processing pipeline is developed that runs various call-end activities including, without limitation: updating aggregate data with values from the raw usage record; gathering data on the tenant and user involved in the call (if the cache of that tenant or user is not fresh); gathering machine-learning features for each of the dimensions for which machine-learning models have been developed; running all machine-learning models against the features, and running all rules against the database, all of which output recommendations (e.g., whether to ignore, block, and/or pass to fraud operations personnel); processing all recommendations; taking the action based on the recommendation; and uploading machine-learning features and all scores/recommendations to the database for further tuning of machine-learning models and development of new machine-learning models.

A processing pipeline has been developed that runs the following call-start and call-tick activities including, without limitation: detecting whether the tenant/user/phone number should be evaluated (based on several factors, primarily this is for throttling of validation); gathering data on the tenant and user involved in the call (if the cache of that tenant or user is not fresh); running all in-progress tenant/user/etc. scoring rules against the data source, all of which should output recommendations (e.g., whether to ignore, block, and/or pass to fraud operations personnel); processing all recommendations, taking the most harsh recommendation and carrying out the action from the recommendation; uploading machine-learning features and all scores/recommendations to a big data source for further tuning of machine-learning models and developing new machine-learning models. This information is also used for developing a user interface (UI) for fraud operations personnel to use to review suspicious behavior detected by the pipeline. After the fraud operations personnel come to decisions and action is taken accordingly, all UI-related data are logged for later audits and are secured with a multi-factor authentication system.

Referring to FIG. 1, the invention may be illustrated as a system. The system may include a VoIP server 100, a fraud detection engine 200, and an investigation server 300. It will be appreciated that the servers and fraud detection engine are called out separately to improve clarity; however, these functions can be part of one physical server or virtual server distributed over a number of physical devices and virtual devices in a typical cloud computing organization. The VoIP server 100 may connect to a network 120. By way of illustration but not limitation, network 120 may be the Internet or, alternatively, a local area network ("LAN") serving a specific organization. Network 120, in turn, includes at least one VoIP device, which may be any device capable of making VoIP connections. By way of illustration but not limitation, a VoIP device may be a VoIP phone 130a, or a mobile device such as smartphone 130b, a computer 130c, or a VoIP adapter 130d with an attached conventional (i.e., non-VoIP) phone 130e.

As shown in FIG. 1, the VoIP server 100 may communicate with each VoIP device. The VoIP server 100 may additionally communicate with the fraud detection engine 200, and with the investigation server 300 which devices may also communicate with each other. Communication between any pair of the aforementioned devices may take place through a suitable network connection. By way of illustration but not limitation, a suitable network connection may be an Ethernet connection, a Wi-Fi connection, or a cellular connection. Each network device may direct another network device to undertake at least one action by means of an API. By way of illustration but not limitation, an API can direct a network device to initiate or terminate a VoIP connection; to query a database and return records responsive to the query; or to add or modify records within a database.

The VoIP server 100, the fraud detection engine 200, and the investigation sever 300 each independently contain a memory device and a processor. As mentioned above, these units can be part of one or more physical or virtual devices or be distributed devices. Each memory device may be any form of non-volatile storage. By way of illustration but not limitation, the memory device may be a hard drive or a solid-state drive. Each memory device contains machine instructions relevant to the role of the corresponding server within the system, and each processor is capable of executing those instructions. Each memory device additionally contains records relevant to the function of the corresponding server.

A person skilled in the art will recognize that the system need not have the exact configuration shown in FIG. 1 to effectively detect and block fraudulent VoIP connections. While the VoIP server 100, the fraud detection engine 200, and the investigation server 300 are depicted as separate machines in FIG. 1, the functions performed by each respective machine may be divided among a larger or smaller number of machines. By way of illustration but not limitation, each block record 314a could be stored on a separate server from the investigation server 300, so that queries of the block records are handled by a dedicated processor. By way of illustration but not limitation, the functions of the fraud detection engine 200 could be combined with those of the investigation server 300 in a single machine. A person skilled in the art will recognize that the exact distributions of functions and records across hardware devices may be adjusted to suit performance requirements for operating the fraud-detection process in real time. The system, for example, may be implemented using a distributed-computing platform (i.e., a "big data" platform), such as the Microsoft® Azure® platform. On a distributed-computing platform, the records held by the investigation server 300 (or any of the servers illustrated) may be distributed across multiple, distinct memory devices. A distributed-computing platform may make use of so-called "processing pipelines" to accommodate the execution of the fraud-detection process for a large number of VoIP connections. A processing pipeline, for example, may contain multiple instances of fraud detection engine 200 running in parallel, with each instance having its own memory device and processor. A person skilled in the art will recognize that various commercially available databases are suitable for storing the records of the system. By way of illustration but not limitation, suitable databases include MySQL® and Microsoft® SQL Server®.

Figure 2:
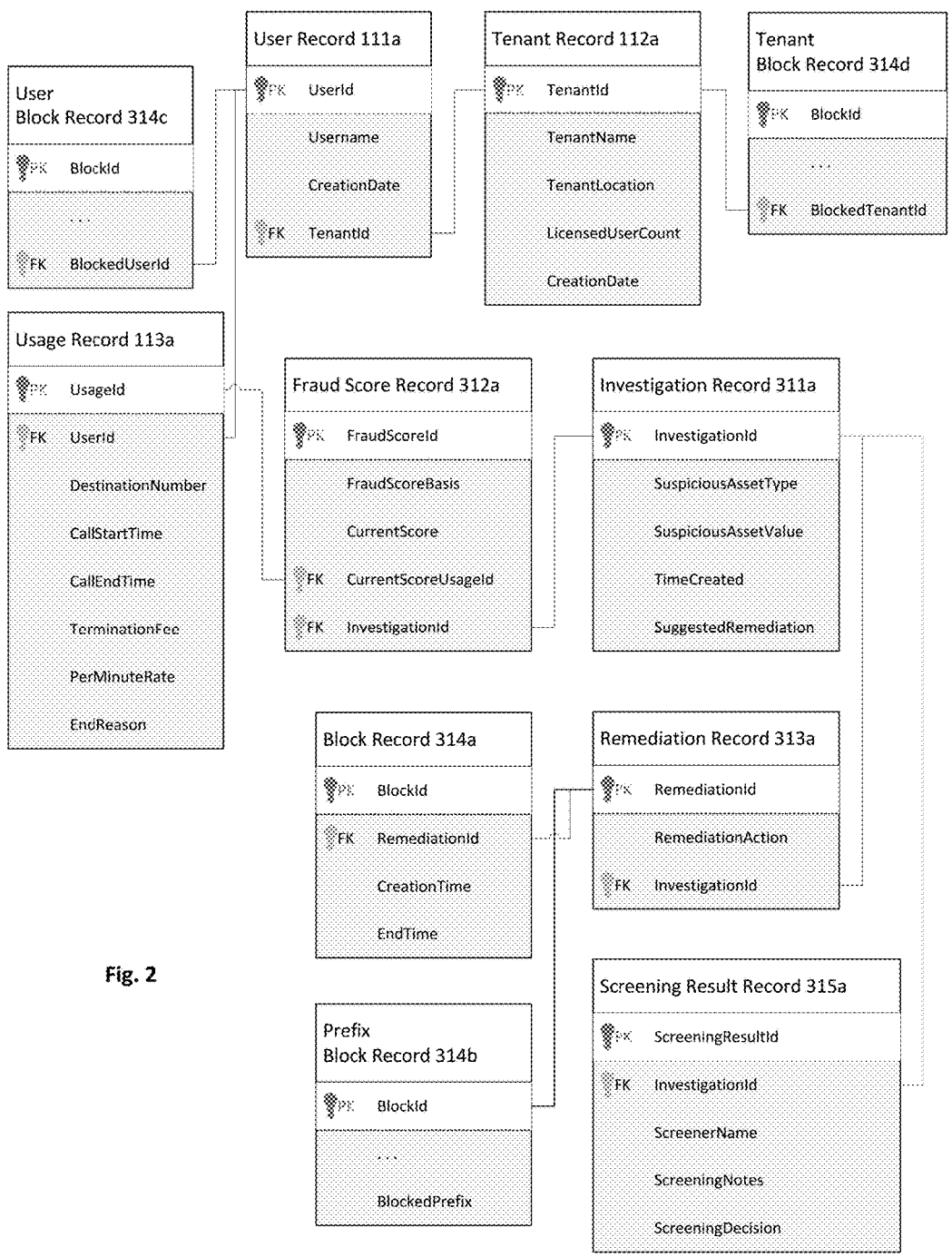
FIG. 2 shows a possible database schema for storing records on VoIP connections.

Referring to FIG. 2, the investigation server 300 may store within its memory device records concerning the users of the system, the VoIP connections made by those users, and VoIP connections deemed fraudulent or abusive. Those records may be stored within a database, for which a possible schema is shown in FIG. 2. The database may include at least one user record 111a, at least one tenant record 112a, at least one usage record 113a, at least one fraud score record 312a, at least one investigation record 311a, at least one remediation record 313a, and at least one block record 314a.

Each user record 111a corresponds to an individual authorized to make VoIP connections using the system. Each user record 111a may include a unique user identifier ("UserId"), the corresponding username ("Username"), and the date on which the user was created ("CreationDate"). In the usual implementation a user is affiliated with a tenant, and if the user is affiliated with a tenant, the user record 111a may additionally include a corresponding unique tenant identifier ("TenantId").

Each tenant record 112a corresponds to a tenant. Each tenant record 112a may include a unique tenant identifier ("TenantId"), a tenant name ("TenantName"), the geographic location of the tenant ("TenantLocation"), the maximum number of users the tenant is authorized to maintain ("LicensedUserCount"), and the date on which the tenant was created ("CreationDate"). It will be appreciated that this explanation of user and tenant record is just one possible way of arranging the data and is presented in this format to facilitate understanding of the operation. The user record inherently contains a reference to the tenant record to which the user belongs, and each tenant record may contain references to all of its constituent users. It is possible to combine the two records or to segregate the constituent information differently.

Each usage record 113a corresponds to a VoIP connection made using the system. Each usage record may include a unique usage identifier ("UsageId"), the PSTN phone number reached by the VoIP connection ("DestinationNumber"), the start time of the call ("CallStartTime"), the end time of the call ("CallEndTime"), the termination fee ("TerminationFee"), and the per-minute cost ("PerMinuteRate"), and the reason for ending the VoIP connection (e.g., a voluntary ending of the call by the user or a forced ending after fraud or abuse is detected).

Each fraud score record 312a corresponds to a fraud score, generated by the system, quantifying the likelihood that a specific VoIP connection is fraudulent or abusive. Each fraud score record 312a may include a unique score identifier ("FraudScoreId"), the name of the fixed rule or machine-learning technique used to generate the fraud score ("FraudScoreBasis"), the score itself ("CurrentScore"), and the unique identifier of the corresponding VoIP connection ("UsageId"). If the fraud score is sufficiently high (as determined by a preset threshold) to trigger an investigation of the VoIP connection, the fraud score record 312a may include the unique investigation identifier ("InvestigationId").

Each investigation record 311a corresponds to a finding by the system that a specific VoIP connection is sufficiently suspicious to warrant an additional investigation of fraud or abuse. Each investigation record 311a may include a unique investigation identifier ("InvestigationId"), the property of the VoIP connection identified as suspicious ("SuspiciousAssetType"), the unique identifier corresponding to that property ("SuspiciousAssetValue"), and the time the investigation was created ("TimeCreated"). If a particular remedial action is suggested to address the suspicious VoIP connection, the suggested remedial action may also be included ("SuggestedRemediation").

Each remediation record 313a corresponds to a specific remedial action. Each remediation record 313a may include a unique remediation identifier ("RemediationId"), the remedial action ("RemediationAction"), and the unique identifier of the corresponding investigation ("InvestigationId").

Each block record 314a corresponds to a restriction ("block") on the creation of further VoIP connections. Each block record 314a may include a unique block identifier ("BlockId"), the unique identifier of the corresponding remediation ("RemediationId"), the time at which the block was created ("CreationTime"), and the time at which the block is scheduled to end ("EndTime").

In practice, each block record 314a may more specifically be a prefix block record 314b, a user block record 314c, or a tenant block record 314d. Each prefix block record 314b includes a country code, region code, or combination thereof to which further VoIP connections are blocked ("BlockedPrefix"). Each user block record 314c includes the unique identifier ("UserId") of the blocked user. Each tenant block record 314d includes the unique identifier ("TenantId") of the blocked tenant.

Each screening result record 315a corresponds to a review of a usage record 113a by a human fraud screener. Each screening result record 315a may include a unique screening result identifier ("ScreeningResultId"), the unique identifier of the corresponding investigation ("InvestigationId"), the name of the screener ("ScreenerName"), notes on the VoIP connection ("ScreeningNotes") and the outcome of the screening ("ScreeningDecision"), such as whether the connection is fraudulent.

A person skilled in the art will recognize that an identifier field may be designated as a primary key to allow for database indexing. A person skilled in the art will recognize that identifier fields may be designated as foreign keys to facilitate cross-referencing of records in queries. The figures are only examples of some of the fields indexed to implement high speed screening; a functioning system may include many additional fields.

The system detects abnormal calling behavior in order to pinpoint fraud or abuse. The call data (user, number called, call duration, etc.) are the raw materials for the process. However, there are several different ways to group these data to facilitate the detection process. One approach is to look primarily at the user (e.g., location of number called, and calling history including call duration and time of call initiation). Another approach is to focus primarily on the tenant (a group of individual users); analyze whether the data of a particular call fit in with the overall pattern of all calls made by the particular tenant. A combination approach of looking both at the user and the tenant may be more effective. For example, if a particular user normally placed short calls to Latin America but suddenly began to place long calls to Eastern Europe, an abnormality would be suspected if one looked only at the user. However, if the tenant as a whole normally placed a mixture of short calls to Latin America and long calls to Eastern Europe, the behavior of the user might no longer appear as abnormal.

Figure 3:
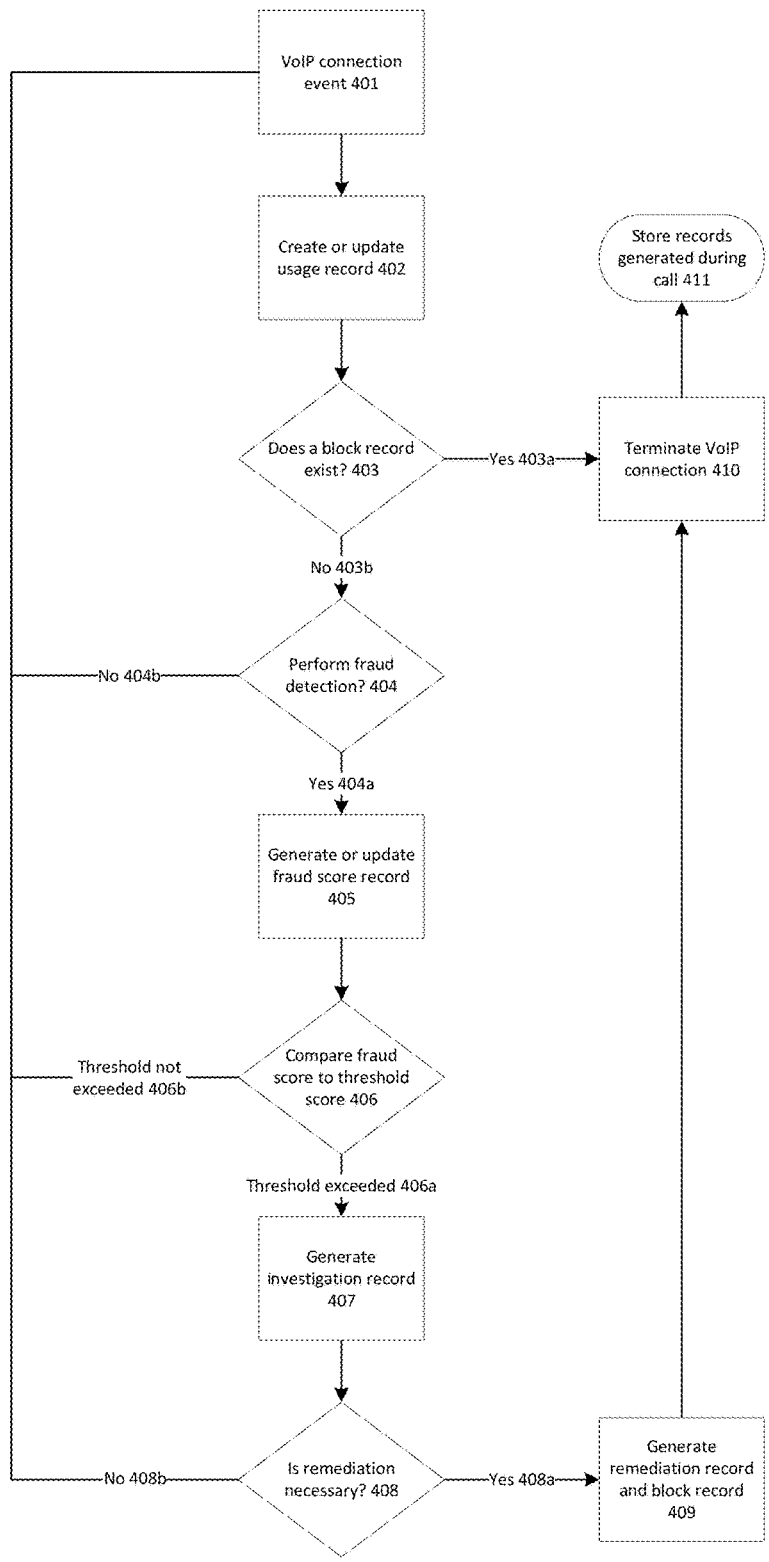
FIG. 3 is a flowchart showing a possible process for fraud detection.

Referring to FIG. 3, the fraud-detection process begins with a VoIP connection event in step 401. By way of illustration but not limitation, a VoIP connection event may be the start of a VoIP connection (a "call-start" event) or a periodic triggering event (a "call-tick" event). If the VoIP connection event is a call-start event, a usage record 113a is created for the VoIP connection in step 402. A query is then performed to determine whether a block record 314a is applicable to the VoIP connection. If an applicable block record 314a is found, the process advances through branch 403a and terminates the VoIP connection in step 410. If no applicable block record 314a is found, the process continues through branch 403b to step 404.

Although in actual practice, the system applies the fraud detection process 404 as a default. However, the system can be configured to "decide" whether to execute the fraud-detection process in step 404. The system may forgo fraud detection to conserve processing resources. If fraud detection step does not operate, the process advances through branch 404b and returns to step 401 upon the next VoIP connection event. Normally, the process advances through branch 404a to step 405.

A fraud score is calculated, and a corresponding fraud score record 312a generated, in step 405. If a fraud score record 312a already exists for the VoIP connection, the record may be updated with the newly calculated fraud score.

The fraud score calculated in step 406 is compared with a threshold score. If the fraud score exceeds the threshold score, the process advances through branch 406a to step 407. If the fraud score does not exceed the threshold score, the process advances through step 406b and returns to step 401 upon the next VoIP connection event. By way of illustration but not limitation, a fraud score may be a numerical value of zero or greater, with larger values indicating a correspondingly higher degree of suspiciousness. A VoIP connection may, for example, begin with a fraud score of zero which increases with the detection of each instance of suspicious behavior. A fixed rule may specify that a VoIP connection to a destination number with a particular country code will have its fraud score increased by a value of 1. If the particular user making the VoIP connection has a history of suspicious activity, a machine-learning technique may specify that the fraud score should be further increased by a value of 2, raising the fraud score to 3. If, for instance, the threshold score is set to be 2, then the VoIP connection will be deemed suspicious, and a further action by the system (e.g., immediate blocking or review by a human fraud screener) may be taken. A person skilled in the art will recognize that the particular fraud-score values assigned by each fixed rule or machine-learning technique, as well as the threshold score, may vary, depending on the particular circumstances in which the system is used. Non-whole-number values for fraud scores, for instance, may be used. Each rule or model has its own thresholds for determining whether something is suspicious or not, and each rule or module runs in isolation from each other. Generally one rule's score has no influence on another rule's score. However, a possible implementation includes a meta-rule that looks at other scores and makes a recommendation based on all of the scores being above some normalized threshold (e.g., at 90% of their threshold). Rules can be completely independent or can be interrelated and or interdependent and may have their results, thresholds or operation affected by overall system behavior.

An investigation record 311a is generated in step 407. A decision as to remediation is reached in step 408. If no remediation is deemed necessary (e.g., the fraud score of the VoIP connection does not exceed the threshold score), the system reverts through branch 408b to step 401. In effect, a no-remediation decision means the VoIP connection is not suspicious enough to warrant further action. If a remediation is determined to be necessary in step 408, the process advances through branch 408a to step 409. By way of illustration but not limitation, the system may simultaneously generate a remediation record 313a and a block record 314a in step 409. This will typically be the case if automatic blocking (i.e., blocking that takes place without further human review) of suspicious VoIP connection is enabled. Alternatively, the suspicious VoIP connection may be flagged as suspicious by a human fraud screener, who separately recommends blocking the VoIP connection. In that case, the remediation record 313a and block record 314a would be generated separately. The VoIP connection is terminated in step 410. The usage record 113a is updated to reflect the termination of the connection and stored in step 411.

Of course, all these processes run asynchronously so that the customer's call is never interrupted by the processing. Before a call is connected, a check is made to ensure that the user or tenant (or called number) is not on a block list so that connections are even not made should such a block exist.

Figure 4:
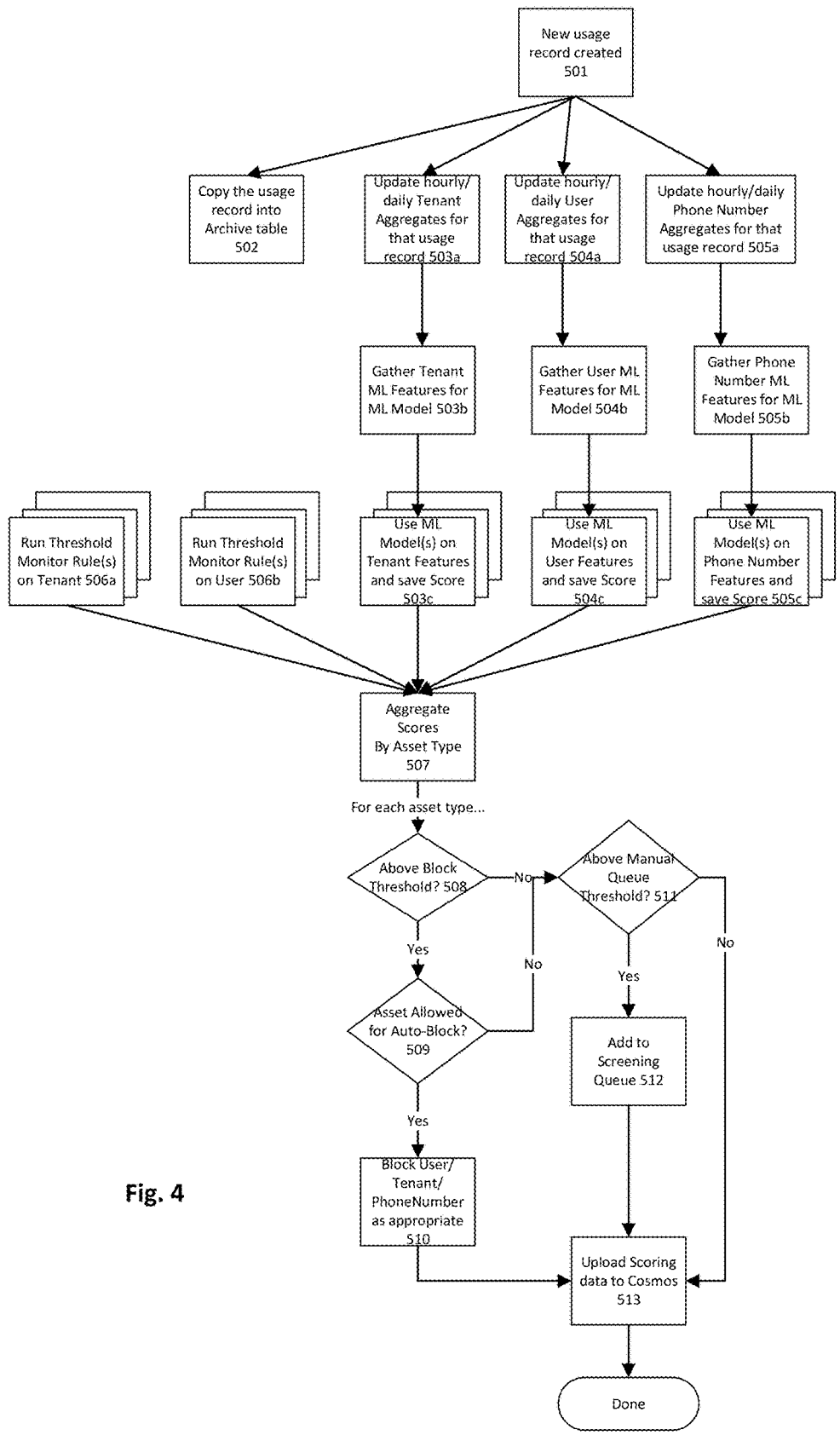
FIG. 4 is a flowchart showing a possible process for aggregating usage records and performing fraud detection on those records.

Referring to FIG. 4, fraud detection may include the application of fixed rules and/or machine-learning techniques. Fraud detection begins with the creation of a new usage record 113a in step 501. A usage record 113a is created at the initiation of a VoIP connection. Once created, a usage record 113a may be updated at each call-tick event to reflect up-to-date information about the ongoing VoIP connection (e.g., the call duration as of the most recent call-tick event). An archived copy of the usage record 113a may be created for long-term storage in step 502. Fraud detection processes based on the usage record 113a can run after the call is completed or while the call is in progress (e.g., 404-405 of FIG. 3). The choice of one versus the other can be based on system performance and load. A shortened version of the pipeline can be used to catch abuse such as excessively long calls or large numbers of concurrent calls while the calls are in progress.

Tenant information from the usage record 113a may be used to update a tenant aggregate record in step 503a. At least one machine-learning model for tenants is assembled in step 503b. The machine-learning model is applied to the tenant aggregate record to create a fraud score in step 503c.

User information from the usage record 113a may be used to update a user aggregate record in step 504a. At least one machine-learning model for users is assembled in step 504b. The machine-learning model is applied to the user aggregate record to create a fraud score in step 504c.

Phone number information from the usage record 113a may be used to update a phone number aggregate record in step 505a. At least one machine-learning model for phone numbers is assembled in step 505b. The machine-learning model is applied to the phone number aggregate record to create a fraud score in step 505c. One way of improving system performance is to replace fraud evaluation of every completed call with a "grouped" approach of combining multiple calls for certain large asset types (such as tenants and regions). For example, the initial processing of usage records is performed as illustrated in the first two rows of FIG. 4, but the third row and beyond is not performed for tenant aggregations, ML feature extraction or fraud scoring until after (after up to five minutes) after call completion. This allows effective detection for established clients that have a "good track record." However, for brand new tenants the whole pipeline is run every time, since they're more or less in a "probationary" status.

In addition to at least one machine-learning technique, at least one fixed rule may be applied to the usage record 113a. A fixed rule on tenant may be applied in step 506a. A fixed rule on users may be applied in step 506b.

The fraud scores calculated in steps 503-506 can be aggregated by asset type (i.e., user, tenant or phone number) in step 507. For each asset type, the fraud score is compared to a block threshold in step 508. If the fraud score exceeds the block threshold, the process advances to step 509. If the fraud score does not exceed the block threshold, the process advances to step 511. It will be appreciated that the various thresholds can be adjusted depending on overall experience including automatic threshold adjustment by the machine-learning models.

If automatic blocking of VoIP connections is enabled in step 509, the VoIP connection is immediately blocked in step 510. If automatic blocking is not enabled in step 509, the process advances to step 511. The decision of whether or not to automatic block is a function of minimizing the risk of over blocking resulting from an auto-block rule. For example, the system does not generally automatically block tenants with a very large number of users. The system does not automatically block tenants who have been with the service for a sufficient period of time. The system is flexible and these choices can be made on a pragmatic basis.

If the fraud score is above a threshold score for further or manual screening (i.e., review by a human fraud screener) in step 511, the VoIP connection is placed in a queue for manual screening in step 512. If fraud score is not above the threshold score for manual screening, the process advances to step 513.

Regardless of whether a VoIP connection is blocked, the corresponding fraud score record may be stored in step 513.

Referring to FIG. 5, an aggregate record summarizes information originating from individual records 113a. As shown in FIG. 5, a tenant aggregate record 601 summaries usage of VoIP services by a specific tenant. An tenant aggregate record 601 may include a unique aggregate record identifier ("AggregateRecordId"), the date on which the aggregate data was produced ("AggregateDate"), the period over which the underlying data was collected ("Aggregate-Period"), the unique identifier of the corresponding tenant ("TenantId"), the number of calls made on the tenant's VoIP account during the period ("CallCount"), the total duration of the calls ("TotalCallDuration"), the average duration of the calls ("AverageCallDuration"), the standard deviation of the duration of the calls ("CallDurationStdDev"), the total cost of the calls ("TotalCost"), and the standard deviation of the cost ("CostStdDev").

Aggregate records can be produced on any dimension deemed relevant to detecting fraud and abuse. By way of illustration but not limitation, the system may include aggregate records for users, tenants, regions, and specific phone numbers (either calling or called to number). An aggregate record summarizes information about VoIP connections originating from individual usage records. An advantage of aggregate records is to allow the system to inspect key aspects of a set of VoIP connections without needing explicitly query for each individual associated usage record. FIG. 5 shows an illustrative aggregate record for a tenant. Aggregate tenant record 601 contains values derived from multiple usage records. The TotalCallDuration field, for example, may indicate the total duration of all VoIP connections made by the corresponding tenant's users over a given period. Likewise, the AverageCallDuration field may store the average duration of those VoIP connections, and the CallDurationStdDev field may store the standard deviation of those durations. While FIG. 5 shows an aggregate record for a tenant, a person skilled in the art will recognize that aggregate records can be generated on the basis of any dimension. Similarly, hard coded rules can be based on an of these dimensions and/or on combinations of these dimensions. By way of illustration but not limitation, aggregate records can be generated for specific users, region codes and country codes. A user aggregate value would be calculated by a hard coded rule and would reflect statistical values (e.g., average and standard deviation of VoIP connection durations) for a specific user; a hard coded rule based on region code aggregate value would do the same for a given region code, and a hard coded rule based on country code aggregate value would do the same for a country code.

The fraud-detection process depicted in FIG. 3 can be executed by the system upon each call-start event and call-tick event. Each time the process is executed, at least one usage record 113a and one fraud score record 312a is generated or updated. By way of illustration but not limitation, the system may update aggregate records as each usage record 113a and each fraud score record 312a is generated. A tenant aggregate record 601, for example, may be updated with information (e.g., call duration) from the latest usage records 113a.

In an exemplary application of the fraud-detection process, a party seeking to misuse the system ("bad actor") may first create a VoIP account, such as a Microsoft® Office 365™ user account with PSTN calling features. The bad actor then tests the newly created VoIP account by placing multiple calls to different destination numbers concurrently or in quick succession. For each call, the process begins upon a VoIP connection event (i.e., the placement of the call) in step 401. A corresponding call record is created in step 402. A query is performed in step 403 for block records 314*a* applicable to the user. Because the VoIP account is new, there is initially no block record 314*a* applicable to the VoIP account. The VoIP server may determine that fraud detection needs to be carried out in step 404. The investigation server 300 generates a fraud score and corresponding fraud score record 312*a* for the VoIP connection in step 405. The fraud score may exceed the threshold score in step 406. An investigation record is generated in step 407. A remediation is deemed necessary in step 408, either because of automatic connection blocking or because a human fraud screener deems blocking necessary. A block record is created in step 409 and the VoIP connection is terminated in step 410. The records generated during the fraud-detection process are used to update relevant aggregate records. Further attempts by the user account to make VoIP connections will be blocked at step 403, when a block record is discovered.

The investigation server 300 creates an investigation record 311*a* in step 407 for the VoIP connection. The investigation server 300 queries for relevant records of fraud in step 405 and returns those records to the fraud detection engine 405. The fraud detection engine 200 determines that the VoIP connections originating from the bad actor are suspicious by virtue of the number of concurrent VoIP connections being maintained. The fraud detection engine 200, applying a machine-learning technique, also determines that the pattern of VoIP connections originating from the's account is far outside the range of behavior expected from normal usage of VoIP services. The fraud detection engine 200 generates a fraud score record 312*a* in step 406. The fraud detection engine 200 compares the fraud score to a threshold fraud score in 407 and finds the threshold to be exceeded. The fraud detection engine 200 updates the investigation record 311*a* to indicate a suggested remediation of review by a human fraud screener. The fraud detection engine 200 creates a remediation record 313*a* and sends the call record to a secondary or human fraud screener. The secondary or human fraud screener concludes the VoIP connection is fraudulent and recommends that the specific user be blocked from making further VoIP connections. A user block record 314*c* is created. For all subsequent VoIP connections requested by the specific user, the process will identify the user block record 314*c* and terminate the VoIP connection in step 402*a*.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The use of the expression "at least" or "at least one" suggests the use of one or more elements or ingredients or quantities, as the use may be in the embodiment of the disclosure to achieve one or more of the desired objects or results.

The numerical values mentioned for the various physical parameters, dimensions or quantities are only approximations and it is envisaged that the values higher/lower than the numerical values assigned to the parameters, dimensions or quantities fall within the scope of the disclosure, unless there is a statement in the specification specific to the contrary.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the subject matter has been described in language specific to structural features and/or methodological acts, it is to be understood that the subject matter defined in the claims that follow is not necessarily limited to the specific features or acts described above. Rather, the specific features and acts described above are disclosed as example forms of implementing the claims.

What is claimed is:

1. An automated system for detecting and responding to a fraudulent or abusive VoIP call connection, the system comprising:
   a processor for executing instructions;
   at least one tenant record;
   at least one call data record; and
   instructions that execute on the processor whereby the system is instructed to carry out the steps of:
   detecting existence of a call connection event;
   retrieving at least one tenant record when the at least one tenant record is available;
   retrieving at least one call data record when the at least one call data record is available;
   calculating a fraud score based on said retrieved records;
   determining if the fraud score exceeds the predetermined fraud score;
   creating a remediation record if the fraud score exceeds a predetermined fraud score;
   updating at least one aggregate call data record to reflect the state of the connection; and
   repeating the steps of detecting, retrieving, calculating, creating, and updating while the call connection event exists;
   whereby the call connection event is either terminated or allowed to continue depending on the fraud score relative to the predetermined fraud score at any particular time during the call connection event.

2. The automated system of claim 1, wherein the tenant record is used in calculating the fraud score.

3. The automated system of claim 1 further comprising at least one user record.

4. The automated system of claim 1, wherein the instructions control the system to calculate a fraud score by applying at least one machine-learning technique to the retrieved records.

5. The automated system of claim 1, wherein the instructions control the system to calculate a fraud score by applying at least one machine-learning technique and at least one fixed rule to the retrieved records.

6. The automated system of claim 1, wherein the instructions additionally control the system to create at least one user block record.

7. The automated system of claim 1, wherein the instructions additionally control the system to create at least one tenant block record.

8. The automated system of claim 1, wherein the instructions additionally control the system to create at least one prefix block record.

9. The automated system of claim 1, wherein the instructions additionally control the system to terminate a fraudulent VoIP call connection.

10. The automated system of claim 1, wherein the instructions additionally control the system to create a screening record.

11. An automated system for aggregating information on fraudulent or abusive VoIP connections, the system comprising:
   a processor for executing instruction;
   at least one aggregate call record; and
   a second storage location containing instructions that control the system to carry out the steps of:
   detecting existence of a call connection event;
   accessing at least one call data record;
   deriving at least one aggregate fraud score based on the at least one call data record;
   updating at least one aggregate call record to reflect the aggregate fraud score;
   repeating the steps of detecting, accessing, deriving and updating while the call connection event exists; and
   determining if the aggregate fraud score exceeds a threshold value;
   whereby the call connection event is either terminated or allowed to continue depending on the aggregate fraud score relative to the threshold value at any particular time during the call connection event.

12. The automated system of claim 11, wherein deriving at least one aggregate fraud score comprises applying at least one fixed rule to the at least one call data record.

13. The automated system of claim 11, wherein deriving at least one aggregate fraud score comprises applying at least one machine-learning technique to the at least one call data record.

14. The automated system of claim 11, wherein deriving at least one aggregate fraud score comprises applying at least one screening result to the at least one call data record.

15. An automated method using a computer network for detecting and responding to a potentially fraudulent or abusive VoIP call connection, the method comprising the steps of:
   detecting the existence of a call connection;
   querying at least one database to retrieve at least one user record and at least one call data record;
   calculating a fraud score for the call connection event on the basis of said retrieved records;
   creating a fraud score record for the fraud score;
   updating at least one aggregate call data record to reflect the state of the connection; repeating periodically the steps of detecting, querying, calculating, creating, storing and updating while the call connection exists; and
   determining if the fraud score exceeds a predetermined fraud score;
   whereby the call connection event is either terminated or allowed to continue depending on the fraud score relative to the predetermined fraud score at any particular time during the call connection event.

16. The method of claim 15 further comprising the step of storing a remediation record if the fraud score exceeds the predetermined fraud score.

17. The method of claim 15, wherein calculating the fraud score comprises applying at least one machine-learning technique to the retrieved records.

18. The method of claim 15, wherein calculating the fraud score comprises applying at least one machine-learning technique and at least one fixed rule to the retrieved records.

19. The method of claim 15, wherein a tenant record is retrieved and used in conjunction with the user record in calculating the fraud score.

20. The method of claim 15, further comprising the step of creating, at least one prefix block record.

* * * * *